US006952948B2

(12) United States Patent
Herbert et al.

(10) Patent No.: US 6,952,948 B2
(45) Date of Patent: Oct. 11, 2005

(54) SPARK PLUG FOR RECEIVING A PRESSURE SENSOR AND CORRESPONDING SPARK PLUG CONNECTOR

(75) Inventors: Wolfgang Herbert, Benningen (DE); Bernd Mueller, Korntal-Muenchingen (DE); Arnold Krieger, Alt-Neuhengstett (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 10/333,660

(22) PCT Filed: May 3, 2001

(86) PCT No.: PCT/DE01/01679

§ 371 (c)(1),
(2), (4) Date: Sep. 25, 2003

(87) PCT Pub. No.: WO02/08714

PCT Pub. Date: Jan. 31, 2002

(65) Prior Publication Data

US 2004/0045345 A1 Mar. 11, 2004

(30) Foreign Application Priority Data

Jul. 21, 2000 (DE) ........................................ 100 35 536

(51) Int. Cl.[7] ............................................. G01M 15/00
(52) U.S. Cl. ..................................... 73/35.12; 73/118.1
(58) Field of Search ............................ 73/35.01, 35.07, 73/35.12, 35.13, 112, 115, 116, 117.2, 117.3, 118.1, 119 R; 324/378, 402

(56) References Cited

U.S. PATENT DOCUMENTS

| | | | | |
|---|---|---|---|---|
| 4,969,353 A | | 11/1990 | Steinke | |
| 5,180,983 A | | 1/1993 | Murata et al. | |
| 6,122,971 A | * | 9/2000 | Wlodarczyk | 73/705 |
| 6,131,465 A | * | 10/2000 | Wlodarczyk et al. | 73/715 |
| 6,204,594 B1 | * | 3/2001 | Ingham | 313/141 |
| 6,597,088 B1 | * | 7/2003 | Glaser et al. | 313/118 |

FOREIGN PATENT DOCUMENTS

| | | |
|---|---|---|
| DE | 41 32 285 | 4/1992 |
| JP | 03 110780 | 5/1991 |
| JP | 09 260024 | 10/1997 |
| WO | WO 97 31251 | 8/1997 |
| WO | WO 98/17988 | 4/1998 |
| WO | WO 00/00800 | 1/2000 |

OTHER PUBLICATIONS

Patent Abstracts of Japan, vol. 15, No. 308 (E–1097), Aug. 7, 1991, Publication No. 03–110780.
Patent Abstracts of Japan, vol. 1998, No. 02, Jan. 30, 1998, Publication No. 09–260024.

* cited by examiner

*Primary Examiner*—Eric S. McCall
(74) *Attorney, Agent, or Firm*—Kenyon & Kenyon

(57) ABSTRACT

A spark plug for accommodating a pressure sensor. A connecting channel for extending a connecting line of the sensor extends in a housing and in a central section of the insulating core of the spark plug. As a result of this setup, the connecting line is extended in a protected manner in the region of the spark plug.

17 Claims, 3 Drawing Sheets

SPARK PLUG FOR RECEIVING A PRESSURE SENSOR AND CORRESPONDING SPARK PLUG CONNECTOR

FIELD OF THE INVENTION

The present invention relates to a spark plug including an insulator core that extends along the longitudinal axis of the spark plug. The insulator core becomes narrower on one side from a central section to an insulator nose. The central section and the insulator nose are enclosed by a spark plug housing which, in the region of the insulator nose is configured as an axially extending threaded sleeve including an outer thread. In the threaded sleeve a sensor accommodating chamber is left open for accommodating a sensor element. A connecting channel formed in the threaded sleeve extends from the sensor accommodating chamber, approximately parallel to the longitudinal axis of the threaded sleeve and on to an outer side of the housing.

BACKGROUND INFORMATION

A spark plug including a pressure sensor built into the sensor accommodation chamber is referred to in Japanese Patent Application No. 092 600 24. In this spark plug, the other end of the connecting channel lies in the edge region of a middle housing part. A connecting electrode is fastened laterally on a nut configured on the housing, for screwing in the spark plug. In this spark plug, the connecting channel runs or extends to the outside at an angle from the transition between the housing sleeve and the middle portion of the housing.

Other spark plugs including pressure sensors in the housing sleeve are referred to in U.S. Pat. No. 4,969,353 and PCT Application No. 9731251. In the case of the spark plugs discussed there, the connecting channel also extends to the outside at an angle in the middle portion of the housing.

SUMMARY OF THE INVENTION

The present invention involves the problem of improving spark plugs including sensors built into housing sleeves. In addition, the present invention describes a spark plug connector which is suitable, particularly, for connecting an ignition cable and a supply line for the sensor to the improved spark plug.

The present invention uses the following considerations as a baseline. If the end of the connecting channel lies at a lateral surface of the spark plug housing, additional space is required for extending through the connecting cable which connects the sensor element to a sensor circuit. If the connecting cable, which is relatively thin compared to the ignition cable, is extended laterally toward the outside in a section of the connecting channel, a large gap is created between ignition cable and connecting cable. This gap has the result that the connecting cable has to be extended separately from the ignition cable over a longer section. The result of this is that, when the spark plug is installed into the engine block, it is easy for the connecting cable to become jammed between the wrench and the screw formed on the spark plug. Even if the ignition cable is connected to a connecting electrode only after the spark plug is screwed into the engine block, damage to the connecting electrode may occur during the installation. The section in which the connecting cable of the sensor is extended separately from the ignition cable lies exposed in the engine block even after the installation of the spark plug and the connection of the connecting cable.

Therefore, the spark plug according to the present invention is configured, in addition to the features described at the beginning, in such a manner that a section of the connecting channel extends in the central section of the insulating core.

The connecting channel exits on the side of the housing lying closest to the terminal for the ignition cable and/or from the insulator core. By this measure, the connecting channel, and thereby also the connecting cable accommodated in the connecting channel may be extended in the entire region of the housing near the ignition cable or at the longitudinal axis of the spark plug. The outlet of the connecting channel lies very close to the longitudinal axis of the spark plug, e.g. at a distance of less than 10 mm, preferably less than 5 mm. It is achieved by these measures that the exposed section of the connecting cable is further shortened in comparison to other spark plugs. As a result of this centrally lying exit, the exit may be positioned directly below the spark plug connector, or even within the spark plug connector. In either case, there is no longer an exposed section of the connecting cable. Therefore the spark plug according to the present invention may allow for a protected extension of the connecting cable along its entire length, or at least in regions which are exposed to mechanical effects when the spark plug is installed.

In one exemplary embodiment of the present invention, the connecting cable extends in the central section of the insulating core, approximately parallel to the longitudinal axis of the spark plug. If the connecting channel is also extended in the central section of the insulating core, parallel to the longitudinal axis or at an insignificant inclination of 1 or 2°, for example, kinks may be avoided over the length of the connecting channel. The connecting channel extends exactly so that a connecting cable in the connecting channel does not kink, and is easy to install.

In an alternative configuration, the connecting channel extends in the central section of the insulating core at an angle to the longitudinal axis of the spark plug, at an angle between 10° and 5°. The angle may allow for the connecting channel to be placed in the region of the insulating core without costly special tools, e.g. with the aid of a (grinding) broach. On the other hand, the angle should not exceed 10°, since otherwise a connecting channel extends outwards at an angle ends too far removed from the ignition cable. On the other hand, a connecting channel extending inwards at an angle is no longer completely insulated by the insulator core.

The positioning of the connecting channel at an angle has the result that, in the longitudinal direction, at the transitions between the housing and the central section, the connecting channel is easily bent. The bend is less than 10° or less than 5°. When the bending amounts to so little, a protective sleeve and/or the connecting cable may still be easily installed in the connecting channel.

In a next configuration, the end of the connecting channel lies between the insulating core and the housing. Particularly in the case of spark plugs which also become narrower in the direction of the connection for the ignition cable, it is achieved by this measure that the connecting channel has to be extended only in a comparatively short section of the insulating core. Thus, the connecting channel may be extended through the same opening in the housing through which the insulating core is also extended. If necessary, a small notch is formed at the opening in the housing which surrounds the insulating core.

If the other end of the connecting channel lies close to the insulator core, at a distance of less than 5 mm, a connecting cable may be extended directly from the end of the connecting channel into a spark plug connector, and is thus protected over its entire extension.

In one exemplary embodiment, the sensor element is pressure-sensitive, so that the sensor signal is a function of the pressure acting upon the sensor element. A piezoelectrically, a piezoresistively or an electrodynamically functioning sensor element is used. Optical sensors are also available. At the present time, sensor elements are on the market which may be installed in the threaded sleeve of the spark plug even if the threaded sleeve has the usual dimensions used for spark plugs up to the present. The positioning of the center electrode and the ground electrode, as well as the coefficient of heat transfer agree with the positioning and the coefficient of heat transfer of the original spark plug. The combustion properties and the pressure characteristic in the combustion chamber agree among the production spark plugs used up to now and the spark plug including a pressure sensor. In particular, the "breathing" properties of the spark plug remain unchanged.

In a next further development, the insulating core becomes narrower from the central section towards a terminal for an ignition cable. Thus, the central section has the largest diameter and is used for fixing the housing.

The present invention also describes a spark plug connector which is suitable especially for the spark plug according to the present invention or its further exemplary embodiment. The spark plug connector includes a housing configured mostly in one piece, in which is located lead-through for an ignition cable. In the spark plug connector according to the present invention, besides the lead-through for the ignition cable, there is an additional lead-through for accommodating a connecting line for a sensor element arranged in the spark plug. If the outlet port of the connecting channel is at a distance from the longitudinal axis of the spark plug which is less than the radius of the spark plug connector, the connecting line may be extension protected over its entire extension to the sensor element. Inside the spark plug, the connecting line is extended in the housing and in the insulating core. Outside the spark plug, the connecting line is extended between the insulating core and the spark plug connector. In the area of the spark plug core, the relatively thin connecting cable may then be connected, for example, to a thicker cable via a plug connection which may include, for instance, a non-removable sheathing and a protective screen.

In another exemplary embodiment of the spark plug connector, the lead-throughs are arranged eccentrically with respect to the longitudinal axis of the spark plug connector. Due to this measure, the spark plug connector may be manufactured having a small diameter, a sufficient distance between the ignition cable and the connecting line of the sensor element being nevertheless ensured.

DETAILED DESCRIPTION

Figure 1:
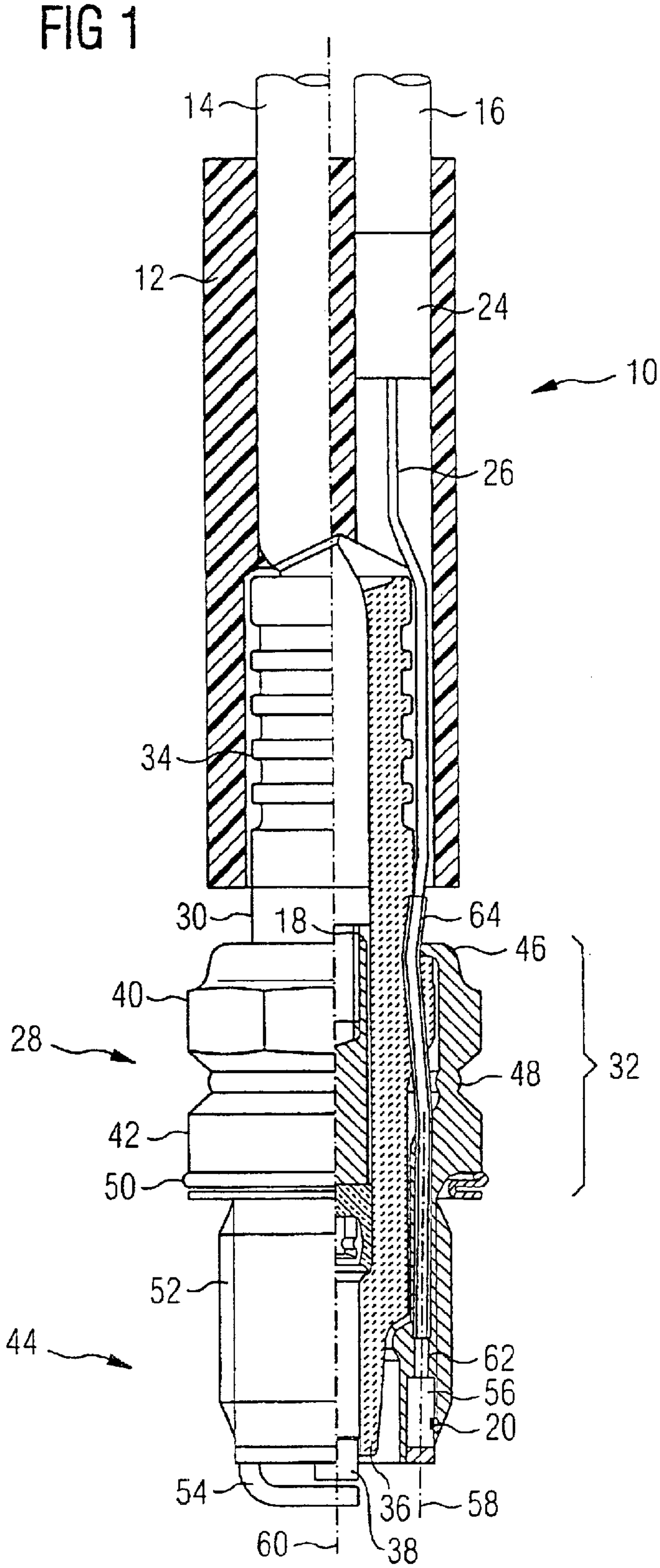
FIG. 1 shows a spark plug in a side view and a partial sectional view.

FIG. 1 shows a spark plug 10, which has the usual dimensions existing to date. A spark plug connector 12, which is used for connecting an ignition cable 14 and a connecting line 16, is plugged onto spark plug 10. Ignition cable 14 carries an ignition voltage of up to 40 kV and is screwed onto connecting stud 18. Connecting line 16 is used for carrying the signal coming from a pressure sensor 20. The values of this signal are at the most 12 V, for example. In the region of spark plug connector 12 there is arranged a connecting element 24, e.g. a plug connecting element, with the aid of which a connecting wire 26 and connecting line 16 are electrically connected to each other.

A metallic spark plug housing 28 encloses the lower part of an insulator core 30, which is made of a ceramic material. Insulating core 30 becomes narrower from a central section 32 to its end. At the upper end of insulating core 30 connecting stud 18 is positioned. Between connecting stud 18 and central section 32, creeping current barriers 34 are expediently formed on the surface of insulating core 30.

In a downward direction, insulating core 30 becomes narrower down to an insulator nose 36 which insulates a center electrode 38. Center electrode 38 is connected to connecting stud 18 in an electrically conducting manner.

At housing 28 there are formed in this sequence a screw-in nut 40, a central housing part 42 and a housing sleeve 44, which each enclose insulating core 30. Above threaded nut 40, an edge 46 bent inwards encloses central section 32 of insulating core 30. Threaded nut 40 is hexagonal, for instance, and may be screwed using a usual plug wrench. Between threaded nut 40 and central housing part 42 there is a circumferential groove 48. Below central housing part 42 there is a sealing ring 50 which is used for sealing one combustion chamber in the engine block. Housing sleeve 44 bears an outer thread 52 which matches an inner thread (not shown) in the engine block Connecting thread 52 is an outer thread, for example. At its end, housing sleeve 44 carries a top electrode 54 which is bent inwards, and thus forms a spark gap of predefined width between center electrode 38 and top electrode 54. At the free end of housing sleeve 44 there is an accommodation chamber 56 for accommodating pressure sensor 20. Accommodation chamber 56 is cylindrical. The longitudinal axis 58 of this cylinder is parallel to longitudinal axis 60 of the spark plug. In principle, longitudinal axis 58 of this cylinder could also lie at an angle to longitudinal axis 60 of the spark plug.

From accommodation chamber 56 a connecting channel 62 extends parallel to longitudinal axis 60, in the direction of connecting stud 18. In central section 32 of insulating core 30, the connecting channel extends approximately parallel to longitudinal axis 60. Connecting channel 62 is coated using an inserted protective casing 64. Protective casing 64 sheathes connecting wire 26 in the region of spark plug housing 28.

The course of connecting channel 62 in the region of the spark plug housing and in central section 32 of insulating core 30 is described with reference to FIGS. 2 and 3.

During the production of spark plug 10, the lead-through for connecting channel 62 in central section 32 is first put into insulating core 30, for example, by grinding using a (grinding) broach. Only then is insulating core 30 connected to housing 28. The lead-through for connecting channel 68 in housing 28 is inserted before or after connecting housing 28 to insulating core 30, for instance by drilling. Protective sheathing 64 is inserted before connecting housing 28 and insulating core 30. Subsequently, sensor element 20 and connecting wire 26 are applied and cemented in, in a gas-tight manner.

Figure 2:
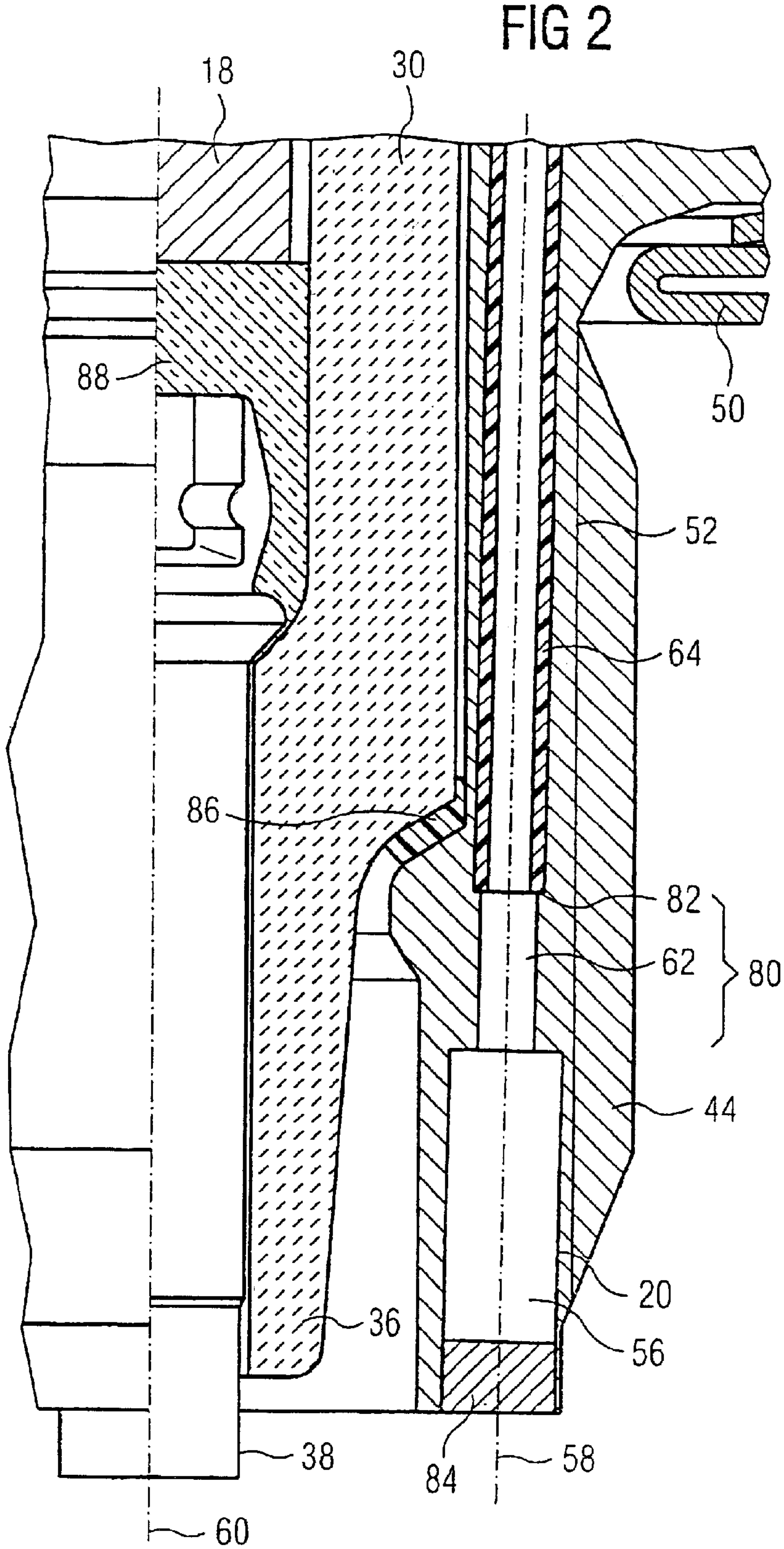
FIG. 2 is an enlarged illustration of a connecting channel in the region of a threaded sleeve of the spark plug.

FIG. 2 is an enlarged illustration of connecting channel 62 in the region of threaded sleeve 44. The reference numerals shown in FIG. 2 corresponds to the reference numerals already described in reference to FIG. 1.

Accommodation chamber 56, connecting channel 62 and protective sheathing 64 in the illustrated region are aligned with respect to longitudinal axis 58 of connecting channel 62. The diameter of connecting channel 62, in this example, is less than the diameter of accommodation chamber 56. In the region of protective sheathing 64, the diameter of connecting channel 62 is somewhat greater than in region 80 which lies directly at accommodation chamber 56 and is not surrounded by protective sheathing 64. An offset 82 is used as a stop when protective sheathing 64 is plugged into connecting channel 62.

Accommodation chamber 56 is closed off by a closure diaphragm 84. In addition, FIG. 2 shows a sealing element 86 extending around longitudinal axis 60, which lies between insulating nose 36 and housing sleeve 44. Center electrode 38 ends in a region filled with a glass melt.88. Glass melt 88 forms an electrical resistor in the milliohm range (kiloohm range is also allowed) between center electrode 38 and an electrode 90 that leads to connecting stud 18.

Figure 3:
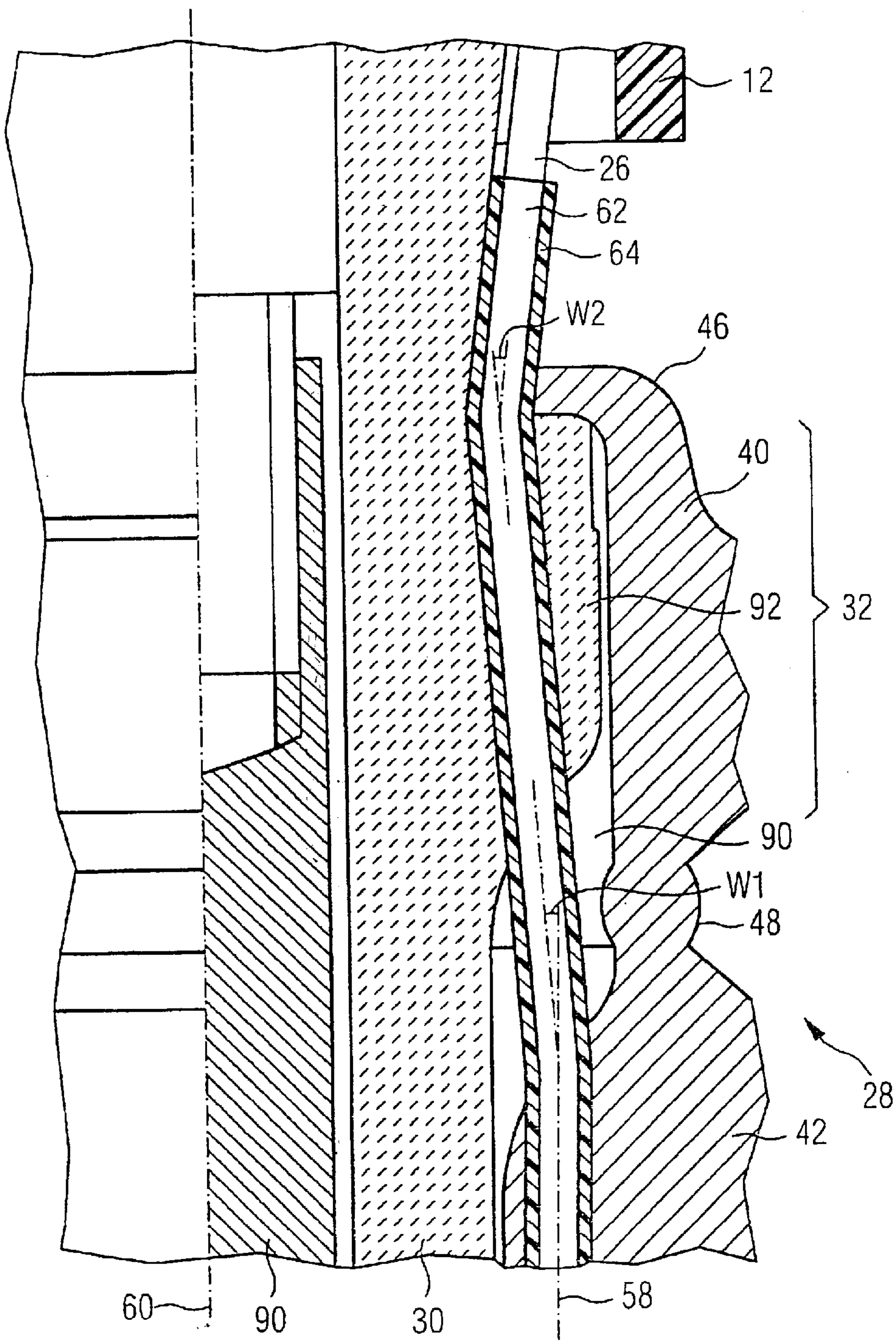
FIG. 3 is an enlarged illustration of the connecting channel in the region of the insulating core of the spark plug.

FIG. 3 is an enlarged illustration of connecting channel 62 in the region of central section 32 of insulating core 30. The reference numerals shown in FIG. 3 corresponds to the reference numerals described in reference to FIG. 1.

Connecting channel 62 first of all enters from central housing part 42 into an inner chamber 90 enclosed by spark plug housing 28. At the entry point into or the exit point from center part 42, the course of connecting channel 62 is buckled by an angle W1, which amounts to about 5°. Between central housing part 42 and insulating core 30, connecting channel 62 is formed by protective sheathing 64. Due to the extending of connecting channel 62 in insulating core 30, a region 92 of insulating core 30 is created which lies between connecting channel 62 and housing 28. Connecting channel 62, in the region of edge 46, is buckled by an angle W2, for instance by an angle of about 9°.

What is claimed is:

1. A spark plug for accommodating a pressure sensor, comprising:

- an insulating core that extends along a longitudinal axis of the spark plug, wherein the insulating core narrows down from a central section of the insulating core to an insulating nose of the insulating core;
- a housing to enclose the central section and the insulating nose, and including an axially extending housing sleeve in a region of the insulating nose;
- a sensor accommodation chamber in the axially extending housing sleeve to accommodate a sensor element;
- a connecting stud for an ignition cable; and
- a connecting channel formed in the axially extending housing sleeve that extends from the sensor accommodation chamber approximately in parallel to the longitudinal axis in the axially extending housing sleeve and beyond that to outside of the spark plug, wherein a section of the connecting channel extends in the central section, and the connecting channel at least one of exits on a side of the housing lying closest to the connecting stud and exits from the insulating core.

2. The spark plug of claim 1, wherein the connecting channel in the central section of the insulating core extends approximately parallel to the longitudinal axis.

3. The spark plug of claim 1, wherein the connecting channel in the central section of the insulating core extends at an angle to the longitudinal axis.

4. The spark plug of claim 3, wherein the angle is between 3 degrees and 10 degrees.

5. The spark plug of claim 3, wherein the connecting channel is bent slightly in an longitudinal direction at transitions between the housing and the central section.

6. The spark plug of claim 5, wherein the connecting channel is bent at a second angle of less than 10 degrees.

7. The spark plug of claim 1, wherein another end of the connecting channel lies between the insulating core and the housing.

8. The spark plug of claim 1, wherein another end of the connecting channel lies near the longitudinal axis.

9. The spark plug of claim 1, wherein the sensor element is pressure-sensitive and includes one of an optically functioning element, a piezoelectrically functioning element, a piezoresistively functioning element and an electrodynamically functioning element.

10. The spark plug of claim 1, wherein the insulating core becomes narrower from the central section to the connection stud.

11. The spark plug of claim 10, wherein the connecting channel exits at a housing edge which is bent inwards and which encircles the central section.

12. A spark plug connector for a spark plug, comprising:

- a housing;
- a first lead-through for an ignition cable in the housing; and
- a second lead-through to accommodate a connecting channel for a sensor element in the spark plug;
- wherein the spark plug is for accommodating a pressure sensor and includes:
  - an insulating core that extends along a longitudinal axis of the spark plug, wherein the insulating core narrows down from a central section of the insulating core to an insulating nose of the insulating core;
  - a housing to enclose the central section and the insulating nose, and including an axially extending housing sleeve in a region of the insulating nose;
  - a sensor accommodation chamber in the axially extending housing sleeve to accommodate the sensor element;
  - a connecting stud for an ignition cable; and
  - a connecting channel formed in the axially extending housing sleeve that extends from the sensor accommodation chamber approximately in parallel to the longitudinal axis in the axially extending housing sleeve and beyond that to outside of the spark plug, wherein a section of the connecting channel extends in the central section, and the connecting channel at least one of exits on a side of the housing lying closest to the connecting stud and exits from the insulating core.

13. The spark plug connector of claim 12, further comprising: separate lead-throughs for the ignition cable and the connecting line.

14. The spark plug connector of claim 12, further comprising: a common lead-through for the ignition cable and the connecting line.

15. The spark plug connector of claim 12, wherein the first lead-through and the second lead-through are positioned eccentrically with respect to a longitudinal axis of the spark plug connector.

16. The spark plug of claim 5, wherein the connecting channel is bent at a second angle of less than 5 degrees.

17. The spark plug of claim 1, wherein another end of the connecting channel lies near the longitudinal axis at a distance of less than 5 mm.

* * * * *